United States Patent
Su

(10) Patent No.: US 7,876,411 B2
(45) Date of Patent: Jan. 25, 2011

(54) MULTI-DOMAIN VERTICAL ALIGNMENT LIQUID CRYSTAL DISPLAY PANEL AND DRIVING METHOD THEREOF

(75) Inventor: Jenn-Jia Su, Chiayi County (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 12/546,691

(22) Filed: Aug. 25, 2009

(65) Prior Publication Data

US 2009/0310046 A1    Dec. 17, 2009

Related U.S. Application Data

(62) Division of application No. 11/161,647, filed on Aug. 11, 2005, now Pat. No. 7,605,896.

(30) Foreign Application Priority Data

Apr. 25, 2005   (TW) ............................. 94113064 A

(51) Int. Cl.
  *G02F 1/1337* (2006.01)
(52) U.S. Cl. .................................... 349/129; 349/139
(58) Field of Classification Search ................. 349/33, 349/128, 129, 138, 139
  See application file for complete search history.

(56) References Cited

U.S. PATENT DOCUMENTS 6,833,899 B2 *  12/2004  Sunohara et al. ............. 349/142
2004/0252261 A1 *  12/2004  Wen et al. ..................... 349/114

* cited by examiner

*Primary Examiner*—David Nelms
*Assistant Examiner*—Nathanael R Briggs
(74) *Attorney, Agent, or Firm*—Jianq Chyun IP Office

(57) ABSTRACT

An MVA-LCD panel, including an active component array substrate, an opposite substrate and a liquid crystal layer disposed between is provided. The active component array substrate includes scan lines, data lines, control lines and pixel units. Each of the pixel units includes an active component, a domain division electrode (DDE) and a pixel electrode. The active component is electrically connected with the corresponding scan line and the corresponding data line, the DDE being electrically connected with the corresponding control line, the pixel electrode being electrically connected with the active component. The pixel electrode has first slits, and the first DDE are disposed under the first slits. The opposite substrate has a common electrode layer facing toward the active component array substrate. The common electrode layer includes second slits and at least a part of the second slits is disposed over the first domain division electrode.

12 Claims, 10 Drawing Sheets

MULTI-DOMAIN VERTICAL ALIGNMENT LIQUID CRYSTAL DISPLAY PANEL AND DRIVING METHOD THEREOF

CROSS-REFERENCE TO RELATED APPLICATION

This application is a divisional of and claims the priority benefit of an application Ser. No. 11/161,647, filed on Aug. 11, 2005, now allowed, which claims the priority benefit of Taiwan application serial no. 94113064, filed on Apr. 25, 2005. The entirety of each of the above-mentioned patent applications is hereby incorporated by reference herein and made a part of this specification.

BACKGROUND OF THE INVENTION

1. Field of the Invention

The present invention relates to a liquid crystal display panel, and particularly to a multi-domain vertical alignment liquid crystal display (MVA-LCD) panel and a driving method thereof.

2. Description of Related Art

Nowadays, a commercial thin film transistor liquid crystal display (TFT-LCD) is required to have the characteristics of high contrast ratio, no gray scale inversion, little color shift, high luminance, high color richness, high color saturation, rapid response and wide viewing angle. The conventional displays which can match the demand for wide viewing angle include twisted nematic (TN) LCD displays with wide viewing films, in-plane switching (IPS) LCD displays, fringe field switching LCD displays and multi-domain vertical alignment (MVA) TFT-LCD displays.

A conventional MVA-LCD panel can match the demand for wide viewing angle because the alignment protrusions or slits of which formed on the color filter substrate or the TFT array substrate make the liquid crystal molecules multi-directionally distributed, and thus obtain several different domains.

FIG. 1 is a diagram for schematically illustrating the relation between the normalized transmittance and the gray level of an MVA-LCD panel. Referring to FIG. 1, the horizontal coordinate represents the gray level and the vertical coordinate represents the normalized transmittance. It can be known from FIG. 1, although a conventional MVA-LCD panel can match the demand for wide viewing angle, the curvature of the transmittance-level curve varies in accordance with the change of the viewing angle. In other words, as the viewing angle changes, the conventional MVA-LCD panel may display a luminance change accordingly, which may further cause a color shift and a color washout. Also, the employment of alignment protrusions may cause a light leakage, and using slits may lead to a requirement for longer response time.

SUMMARY OF THE INVENTION

In view of the above, an object of the present invention is to provide an MVA-LCD panel requiring shorter response time.

And another object of the present invention is to provide a driving method for driving an MVA-LCD panel.

Also, a further object of the present invention is to provide an MVA-LCD panel having better displaying quality.

According to the above and other objects, the present invention provides an MVA-LCD panel including an active component array substrate, an opposite substrate and a liquid crystal layer. Wherein, the liquid crystal layer is disposed between the active component array substrate and the opposite substrate. The active component array substrate includes a plurality of scan lines, a plurality of data lines, a plurality of control lines and a plurality of pixel units. Each of the pixel units is controlled by the corresponding scan line, data line and control line. Each of the pixel units includes an active component, a first domain division electrode (DDE) and a pixel electrode. The active component is electrically connected with the corresponding scan line and the corresponding data line. The first DDE is electrically connected with the corresponding control line; the pixel electrode is electrically connected with the active component. A pixel electrode has a plurality of first slits, the first DDE being disposed under the first slits. The opposite substrate has a common electrode layer facing toward the active component array substrate; the common electrode layer has a plurality of second slits and at least a part of the second slits is disposed over the first domain division electrode (DDE).

Each pixel electrode of the above-described pixel units further includes a plurality of third slits, and each of the third slits being distributed between two adjacent first slits. Moreover, each of the pixel units further includes a second DDE disposed under a part of the third slits. The second DDE is electrically connected with a corresponding control line.

The above-described common electrode layer includes a plurality of common electrode sets being insulated from each other. Each of the common electrode sets includes a plurality of common electrodes, and each of the pixel units is corresponding to at least one of the common electrodes of the common electrode sets.

According to the above and other objects, the present invention provides a driving method being adapted for the foregoing MVA-LCD panel. The driving method includes the steps of: inputting a control voltage to a DDE to pre-tilt the liquid crystal molecules of the liquid crystal layer; after a predetermined time of inputting the control voltage, inputting a data signal to the pixel unit.

The values of the foregoing control voltages may be periodically changed. Also, the absolute value of the voltage difference between the control voltage and the common electrode layer is larger than the absolute value of the voltage difference between the pixel electrode and the common electrode layer.

According to the above and other objects, the present invention provides a driving method being adapted for the foregoing MVA-LCD panel. The driving method includes the steps of: inputting a control voltage to a DDE to pre-tilt the liquid crystal molecules of the liquid crystal layer; inputting a plurality of common electrode voltages respectively to the corresponding common electrode sets; after a predetermined time of inputting the control voltage, inputting a data signal to the pixel unit.

The values of the foregoing control voltages may be periodically changed. In addition, the values of the foregoing common electrode voltages may be periodically changed. Further, the control voltages and the common electrode voltages can also be respectively inputted to the domain division electrodes and the corresponding common electrode sets at the same time. Also, the absolute value of the voltage difference between the control voltage and the common electrode layer is larger than the absolute value of the voltage difference between the pixel electrode and the common electrode layer. The differences among the common electrode voltages can be ranged from 0.1V to 5V According to the above and other objects, the present invention provides an MVA-LCD panel including an active component array substrate, an opposite substrate and a liquid crystal layer. The liquid crystal layer is disposed between the active component array substrate and the opposite substrate. The active component array substrate includes a plurality of scan lines, a plurality of data lines, and a plurality of pixel units. Each of the pixel units is controlled by the corresponding scan line and data line. Each of the pixel units includes an active component and a pixel electrode, the active component is electrically connected with the corresponding scan line and the corresponding data line. The pixel electrode is electrically connected with the active component. The opposite substrate has a common electrode layer facing toward the active component array substrate, and the common electrode layer includes a plurality of common electrode sets being insulated from each other. Each of the common electrode sets includes a plurality of common electrodes, and each of the pixel units is corresponding to at least one of the common electrodes of the common electrode sets.

According to the above and other objects, the present invention provides a driving method being adapted for the foregoing MVA-LCD panel. The driving method includes the steps of: inputting a control voltage to a DDE to pre-tilt the liquid crystal molecules of the liquid crystal layer; inputting a plurality of common electrode voltages respectively to the corresponding common electrode sets; and inputting a data signal to the pixel unit.

The values of the foregoing common electrode voltages may be periodically changed.

The differences among the common electrode voltages can be ranged from 0.1V to 5V.

According to the above and other objects, the present invention provides an MVA-LCD panel including an active component array substrate, an opposite substrate, a dielectric layer and a liquid crystal layer. Wherein, the liquid crystal layer is disposed between the active component array substrate and the opposite substrate. The active component array substrate includes a plurality of scan lines, a plurality of data lines, a plurality of control lines and a plurality of pixel units. Each of the pixel units is controlled by the corresponding scan line, data line and control line. Each of the pixel units includes an active component, a DDE and a pixel electrode. The active component is electrically connected with the corresponding scan line and the corresponding data line, the DDE is electrically connected with the corresponding control line, the pixel electrode is electrically connected with the active component. A pixel electrode has a plurality of first slits and a plurality of third slits, and the DDE is disposed under the first slits. The opposite substrate has a common electrode layer facing toward the active component array substrate. The dielectric layer covers a part of the common electrode layer and/or covers some of the pixel electrodes.

The foregoing dielectric layer may cover the third slits. The dielectric layer may cover the common electrode layer disposed over the DDE, too. Moreover, the material of the dielectric layer can be a transparent organic material or a transparent inorganic material.

In summary, adoption of DDEs in the present invention not only solves the problem of light leakage, but also pre-tilts the liquid crystal molecules for shortening the response time required. Furthermore, according to the present invention, two effective voltages are applied to the liquid crystal layer over a same pixel unit; therefore, the problems of color shift and color washout in accordance with the viewing angle changes can be eliminated.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The First Embodiment

Figure 2A:
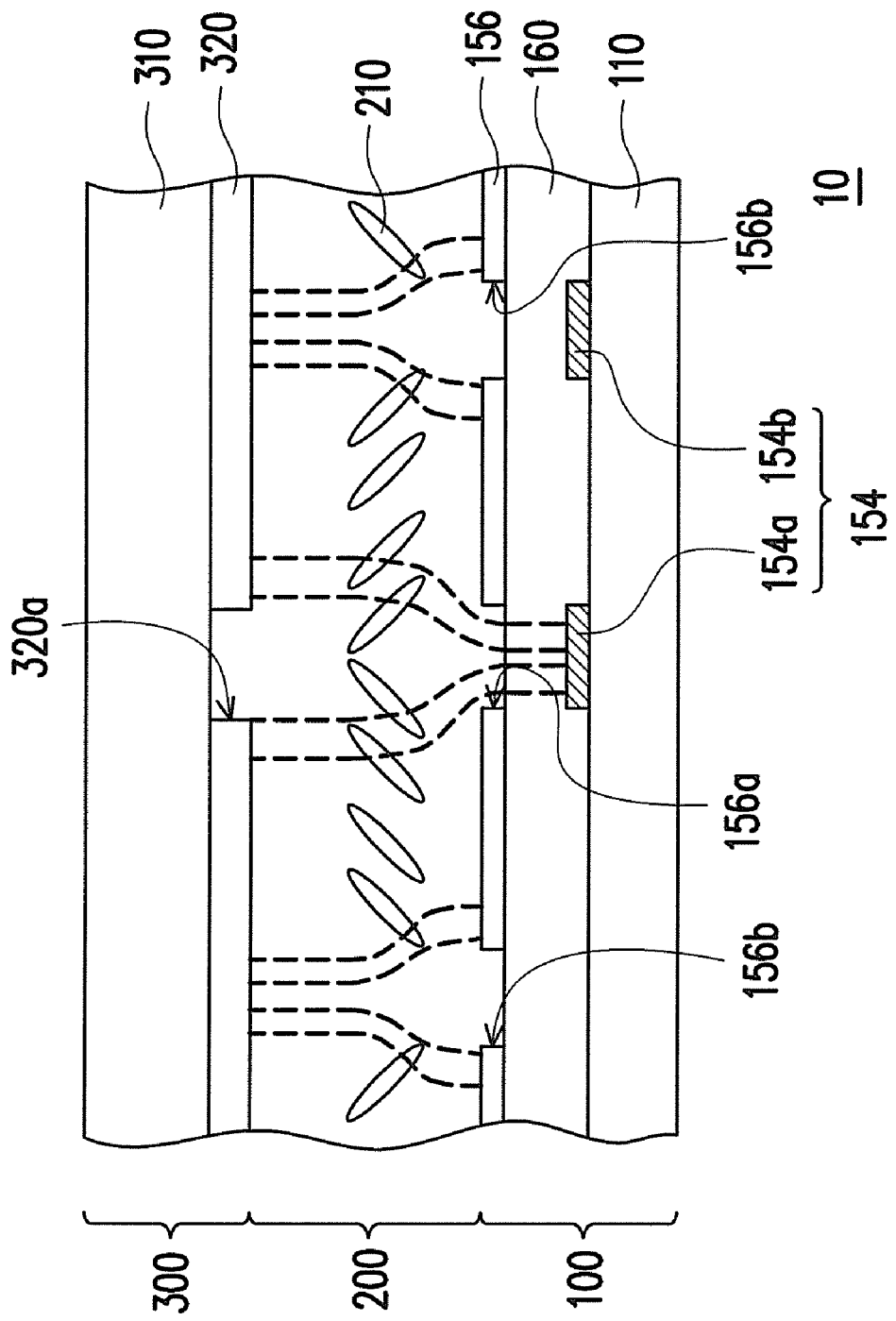
FIG. 2A is a cross-sectional view of an MVA-LCD panel according to the first embodiment of the present invention.
Figure 2B:
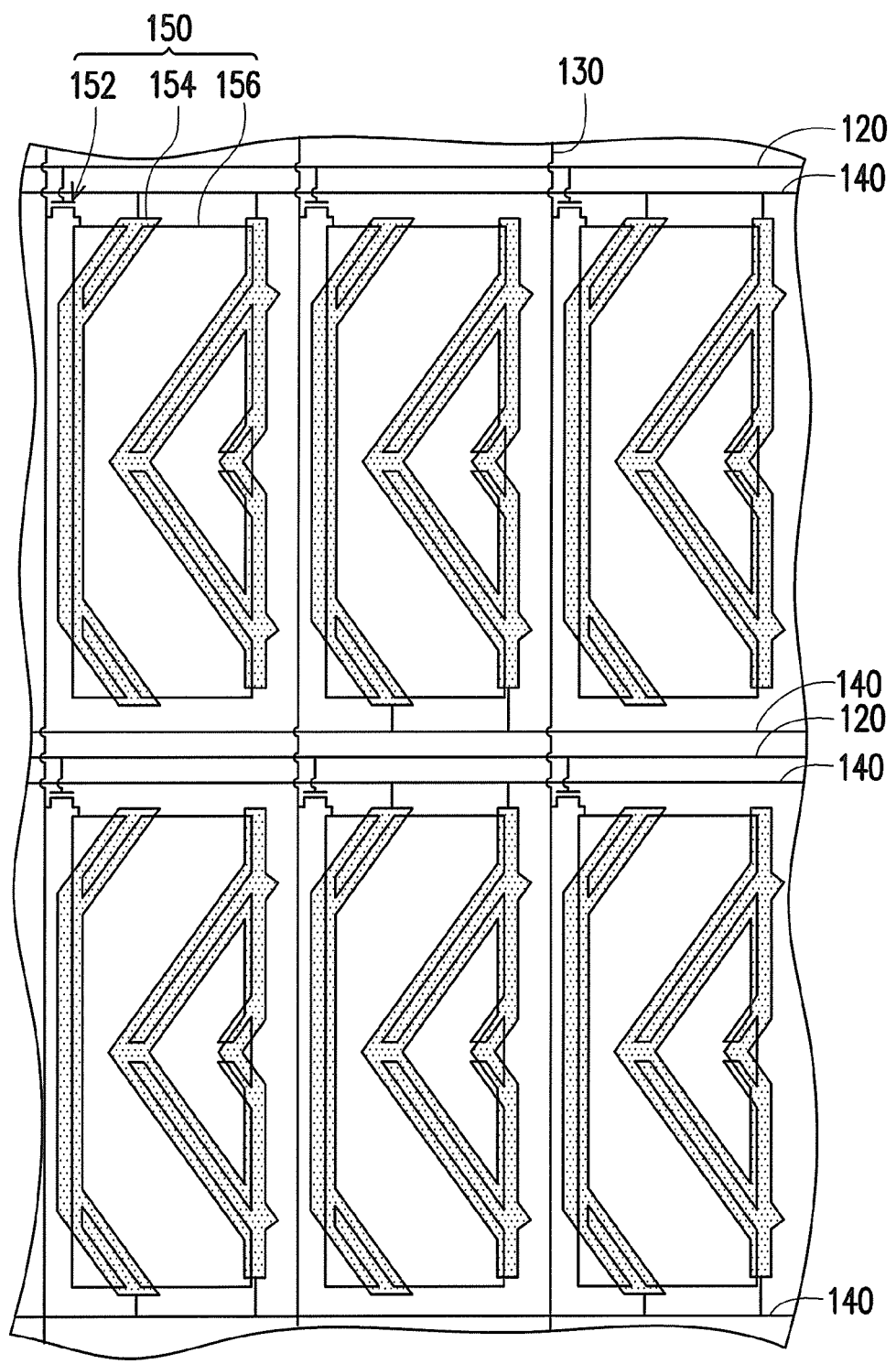
FIG. 2B is a top view of the active components array substrate of FIG. 2A.

FIG. 2A is a cross-sectional view of an MVA-LCD panel according to the first embodiment of the present invention and FIG. 2B is a view from the top of the active components array substrate of FIG. 2A. Referring to FIGS. 2A and 2B, a MVA-LCD panel includes an active component array substrate 100, an opposite substrate 300 and a liquid crystal layer 200. The liquid crystal layer 200 is disposed between the active component array substrate 100 and the opposite substrate 300.

The active component array substrate 100 can be a thin film transistor (TFT) array substrate, a diode array substrate or other active component array substrates, while the opposite substrate 300 for example can be a color filter substrate. However, the active component array substrate 100 can also be a color filter on array (COA) substrate, while the opposite substrate 300 is an upper substrate having common electrodes. The COA substrate has a structure of a TFT array substrate with a color filter film formed thereon.

The active component array substrate 100 includes a substrate 110, a plurality of scan lines 120, a plurality of data lines 130, a plurality of control lines 140 and a plurality of pixel units 150. The scan lines 120, the data lines 130, the control lines 140 and the pixel units 150 are disposed on the substrate 110. Each of the pixel units 150 is controlled by the corresponding scan line 120, data line 130 and control line 140.

In detail, each of the pixel units 150 includes an active component 152, a DDE 154 and a pixel electrode 156. The active component 152 is electrically connected with the corresponding scan line 120 and data line 130. According to the embodiment, the active component 152 is a TFT. However the active component 152 can also be a diode or other active components having three terminals. Furthermore, the DDE 154, which is to be illustrated in detail later, is electrically connected with the corresponding control line 140. According to the embodiment, the DDE 154 can be substantially taken as being composed of a first DDE 154a and a second DDE 154b. A dielectric layer 160 covers the first DDE 154a and the second DDE 154b, and the pixel electrode 156 is disposed on the dielectric layer 160. The pixel electrode 156 having a plurality of slits 156a is electrically connected with the active component 152, and the first DDE 154a is disposed below the slits 156a.

The opposite substrate 300 includes a substrate 310 and a common electrode layer 320. The common electrode layer 320 facing toward the active component array substrate 100 is disposed on the substrate 310. The common electrode layer 320 has a plurality of slits 320a and at least a part of the slits 320a is disposed over the first DDE 154a.

It should be noted that the pixel electrodes may have a plurality of slits 156b, each of the slits 156b being located between two slits 156a. The second DDEs 154b are disposed under some slits 156b while the slits 156b are not corresponding to any slits 320a (as shown at the right side of FIG. 2A). However, some slits 156b may not have any DDEs 156b disposed underneath (as shown at the left side of FIG. 2A). There are many models adapted for driving an MVA-LCD panel 10, for example, a dot inversion driving model for achieving a lower cross talk or a pulse driving model for a better dynamic displaying quality. A dot inversion driving model is to be illuminated as an example below.

Figure 3A:
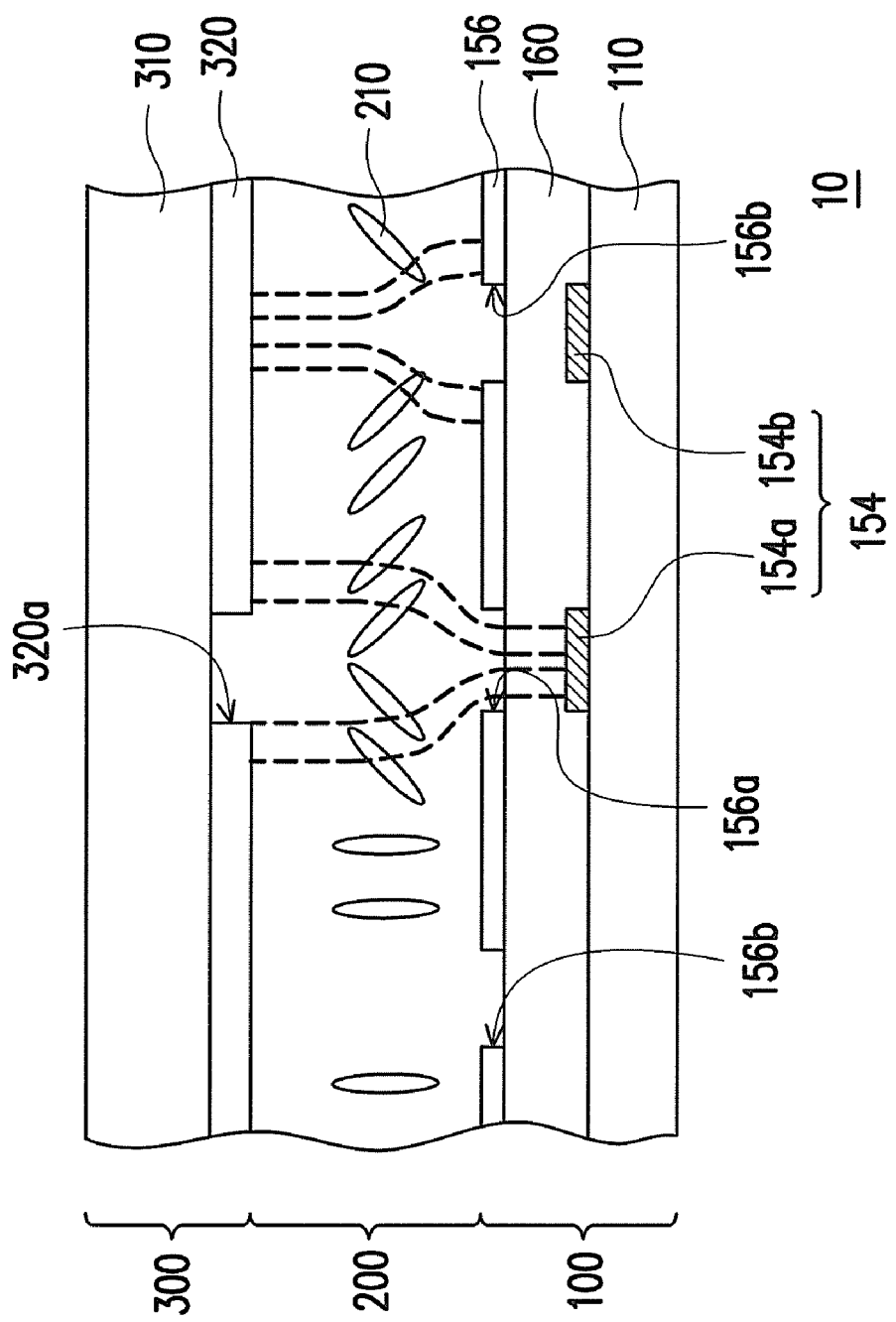
FIG. 3A is a schematic diagram illustrating the pre-tilt molecules of an MVA-LCD panel according to the first embodiment of the present invention.
Figure 3B:
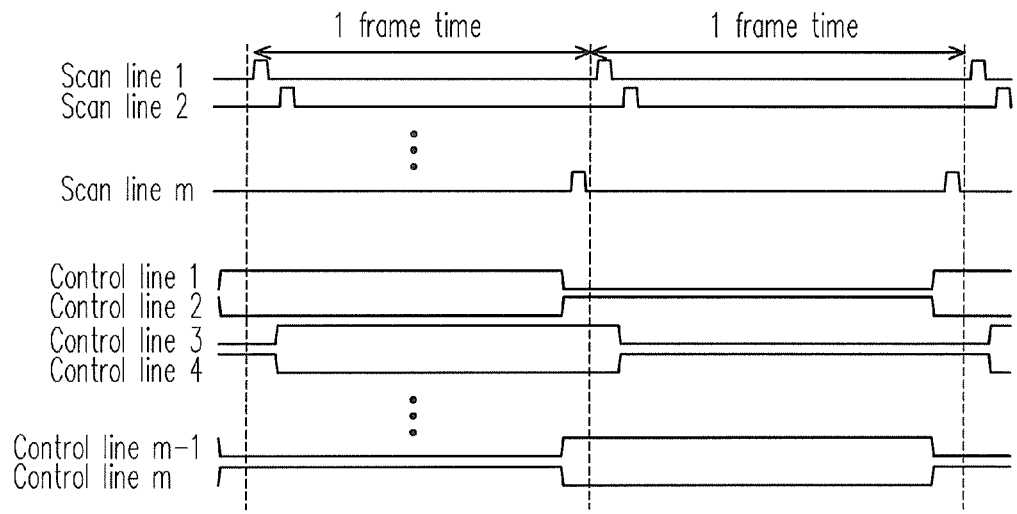
FIG. 3B is a dot inversion driving waveform timing sequence diagram of an MVA-LCD panel according to the first embodiment of the present invention.

FIG. 3A is a schematic diagram illustrating the pre-tilt molecules of an MVA-LCD panel according to the first embodiment of the present invention. FIG. 3B is a dot inversion driving waveform timing sequence diagram of an MVA-LCD panel according to the first embodiment of the present invention. Referring to FIGS. 3A and 3B, a driving method including inputting a control voltage to a DDE 154 for pre-tilting the liquid crystal molecules 210 of the liquid crystal layer 200 (as shown in FIG. 3A). Moreover, the control voltage may sustain last a frame time for achieving a stable operation. Further, a voltage difference is being sustained between the control voltage and the voltage of the common electrode layer 320. Meanwhile, the absolute value of the voltage difference between the control voltage and the common electrode of the opposite substrate 300 is larger than the absolute value of the voltage difference between the pixel electrode 156 and the common electrode.

For instance, when a common electrode voltage is 6V and the corresponding pixel electrode voltage is from 6V to 11.5V, the absolute value of the voltage difference between the pixel electrode 156 and the common electrode is from 0 to 5.5V. Under this circumstance, the absolute values of the voltage differences between the control voltages of the pixel units 150 and the common electrodes of the opposite substrate 300 should be respectively larger than the absolute values of the voltage differences between the pixel electrodes 156 and the common electrodes. Therefore, the control voltage, for example, can be 0V or less than 0V, or 12V or more than 12V, or fixed at 16V Similarly, when the pixel electrode voltages are from 0.5V to 6V, the absolute values of the differences between the control voltage and the common electrode voltages should be respectively larger than the absolute values of the voltage differences between pixel electrodes and the common electrodes. Consequently, the control voltage can be set, for example, 0V or less than 0V, or 12V or more than 12V, or fixed at, for example, −4V Briefly, when a common electrode voltage is 6V and the corresponding pixel electrode voltage is from 6V to 11.5V, the control voltage should be either larger than the difference therebetween or fixed at, for example, 16V When the pixel electrode voltage is from 0.5V to 6V, the absolute value of the difference between the control voltage and the common electrode voltage should be larger than the absolute value of the voltage difference between the pixel electrode and the common electrode. For simplicity, the control voltage can be fixed at, for example, −4V. However, the control voltage is not exclusively being 16V or −4V according to the embodiment, in that all of those satisfying the requirement that the absolute value of the difference between the control voltage and the common electrode voltage is larger than the absolute value of the voltage difference between the pixel electrode and the common electrode are acceptable. Hereby, the control voltage can be other than the foregoing examples and those skilled in the art may change the control voltage according to the virtual design of the products. Furthermore, the value of the control electrode voltage may be changed periodically taking a frame time as a period of time; and the driving time of the control electrode can be completed within a frame time. For example, the predetermined foregoing driving time can be less than 8×10−3 s.

After a predetermined time of inputting the control voltage, a data signal is inputted to the pixel unit 150 (as shown in FIG. 2A). And, the predetermined time is shorter than a frame time, for example, shorter than 16.6×10−3 s or 1×10−3 s. For example, when inputting a data signal to a pixel unit 150 in a dot inversion driving model, the control voltage is inputted to a DDE 154 via a control line 140. The voltage of each control line 140 will be changed after every frame time. Then, after the liquid crystal molecules 210 of the liquid crystal layer 200 being pre-tilted, a starting signal is to be inputted in sequence to the scan lines 120. Simultaneously, a data signal is outputted in sequence to the pixel units 150 according to the dot inversion driving model. At this time, the voltage polarities of two adjacent pixel units 150 are inputted to a same column or a same row, which are opposite to each other (for example, positive, negative, positive, negative).

In detail, the common electrode layer 320 may have a voltage of 6V and the pixel electrode 156 may have a voltage ranged from 6V to 11.5V for positively driving. However, the pixel electrode 156 may also have a voltage ranged from 0.5V to 6V for negatively driving.

The MVA-LCD panel 10 may adopt either a normally black image model or a normally white model. Since the DDE 154 is formed by a nontransparent conductive material, the problem of light leakage of the DDE 154 can be avoided. Further, comparing to employing slits only, the DDE 154 makes the liquid crystal molecules 210 pre-tilted and the MVA-LCD panel 10 consequently has a shorter response time. It should be noted that the model for inputting the data signals to the pixel unit 150 should not be limited as a dot inversion driving model. Other adoptable driving models such as a pulse driving model may also be selected.

Figure 4:
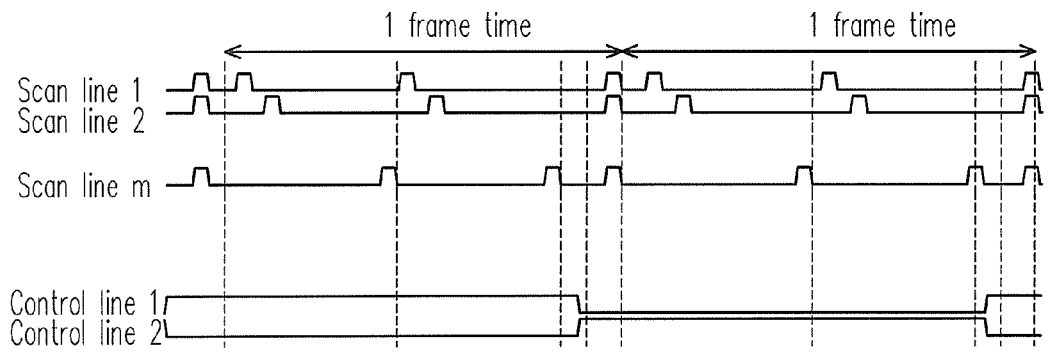
FIG. 4 is a pulse driving waveform timing sequence diagram of an MVA-LCD panel according to the first embodiment of the present invention.

FIG. 4 is a pulse driving waveform timing sequence diagram of an MVA-LCD panel according to the first embodiment of the present invention. Referring to FIGS. 2B and 4, in order to simplify the driving model of DDEs 154, all the DDEs 154 may be electrically connected to two control lines 140, respectively. The driving method includes: (a) respectively inputting voltages to the two control lines 140, and the voltages the two control lines 140 transmitted are different from each other; (b) after a predetermined time which is usually shorter than a normal frame time, respectively inputting data signals to the pixel units 150 which are the former half part of the first frame time; (c) thereafter, inputting a dim voltage during the latter half part of the first frame time (the data signal voltages are not shown), and then returning back to a black image; (d) changing the value of the control voltage; and repeating the steps from (b) to (d). Such a driving method can fixedly change the voltage of the control electrode in a period of time. The period can be a frame time, less than a frame time or two times of a frame time, or more than two times of a frame time. The driving circuit is comparatively simple, and the complexity of the processing process thereof can be reduced accordingly. It is to be noted that the driving method of FIG. 4 can be adapted for the structure of FIG. 2B.

The Second Embodiment

Figure 5A:
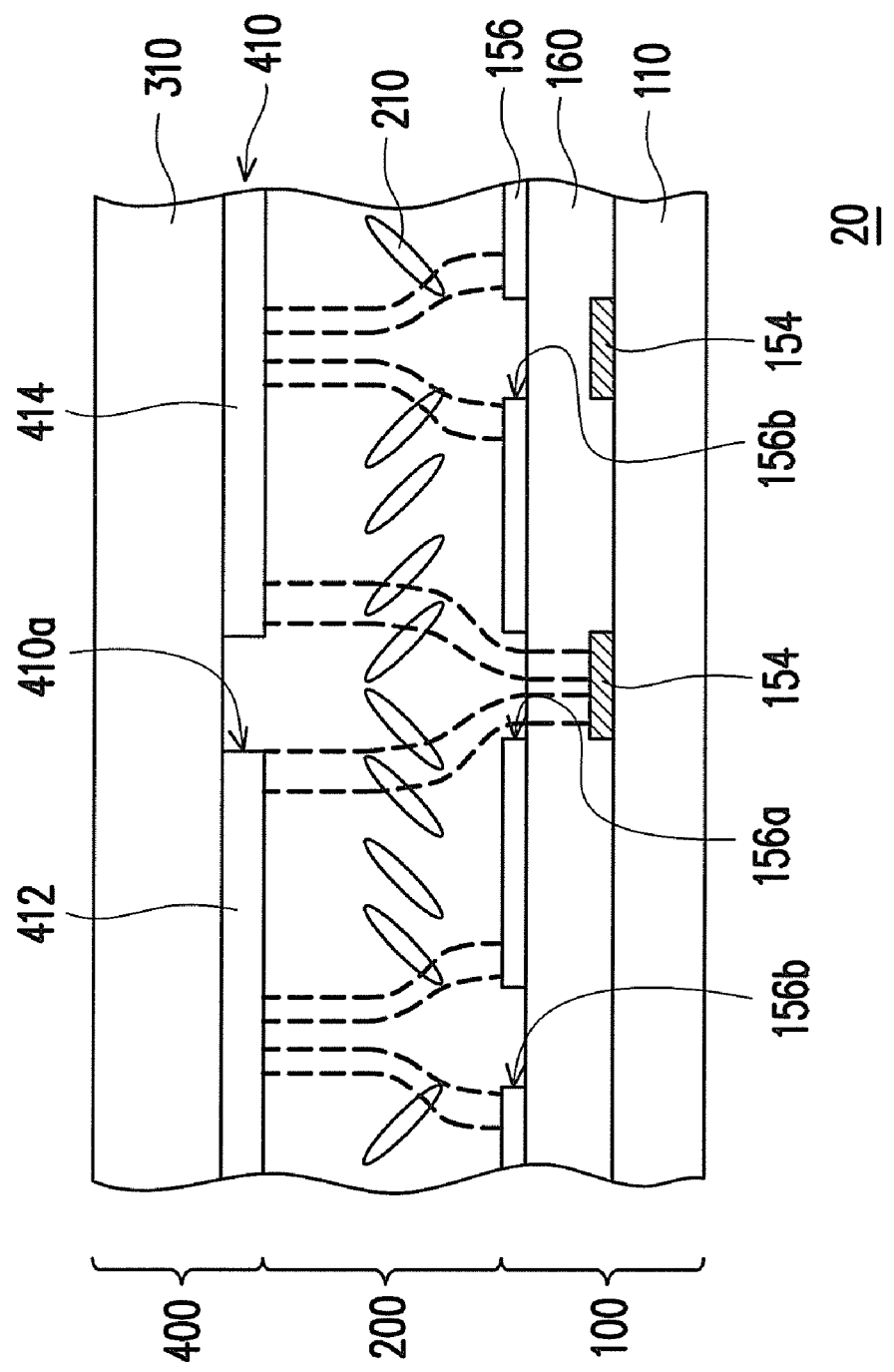
FIG. 5A is a cross-sectional view of an MVA-LCD panel according to the second embodiment of the present invention.
Figure 5B:
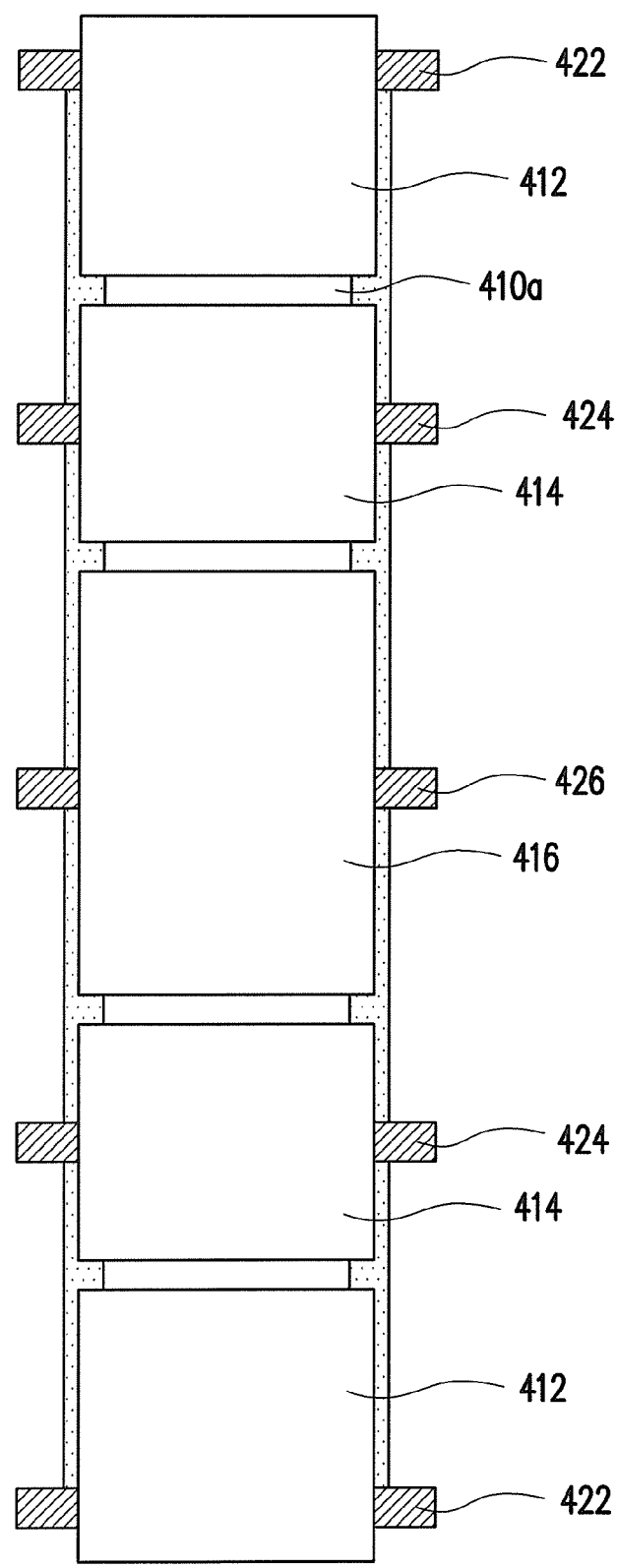
FIG. 5B is a top view of the opposite substrate of FIG. 5A.

FIG. 5A is a cross-sectional view of an MVA-LCD panel according to the second embodiment of the present invention. FIG. 5B is a view of the opposite substrate of FIG. 5A from the liquid crystal side. Referring to FIGS. 5A and 5B, both of which use two pixels (upper and lower) as example for illustration, while it may apply in a display panel containing one or multiple pixel units. According to the embodiment of the MVA-LCD panel 20, the common electrode layer 410 of the opposite substrate 400 includes a plurality of common electrode sets 412, 414 and 416, and the common electrode sets are insulated from each other. Further, each of the common electrode sets 412, 414 and 416 includes a plurality of common electrodes; however, only the adjacent two upper and lower pixel electrodes are illustrated as an example according to FIG. 5B, herein the common electrode sets 412, 414 and 416 respectively include two, two and one common electrodes. In this embodiment, each of the pixel units 150 is corresponding to three common electrode sets 412, 414 and 416. It should be noted that although the common electrode layer 410 according to the embodiment is illustrated as being composed of three common electrode sets 412, 414 and 416, the common electrode layer 410 according to the embodiment may also be composed of two or four or more than four common electrode sets.

Furthermore, because the common electrode layer 410 has a relatively higher ohmic value, the opposite substrate 400 may further include a plurality of conducting line sets, each of the conducting line sets including a plurality of conducting lines. According to FIG. 5B, only the adjacent two upper and lower pixel electrodes are illustrated as an example, herein each of the conducting line sets 422, 424 and 426 in FIG. 5B respectively have two, two and one conducting line. The common electrode sets 412, 414 and 416 respectively cover the corresponding conducting line sets 422, 424 and 426. Therefore, voltages can be respectively inputted to the corresponding common electrode sets 412, 414 and 416 via the conducting line sets 422, 424 and 426. A pulse driving model for driving an MVA-LCD panel according to the present invention is to be illustrated below.

Figure 6:
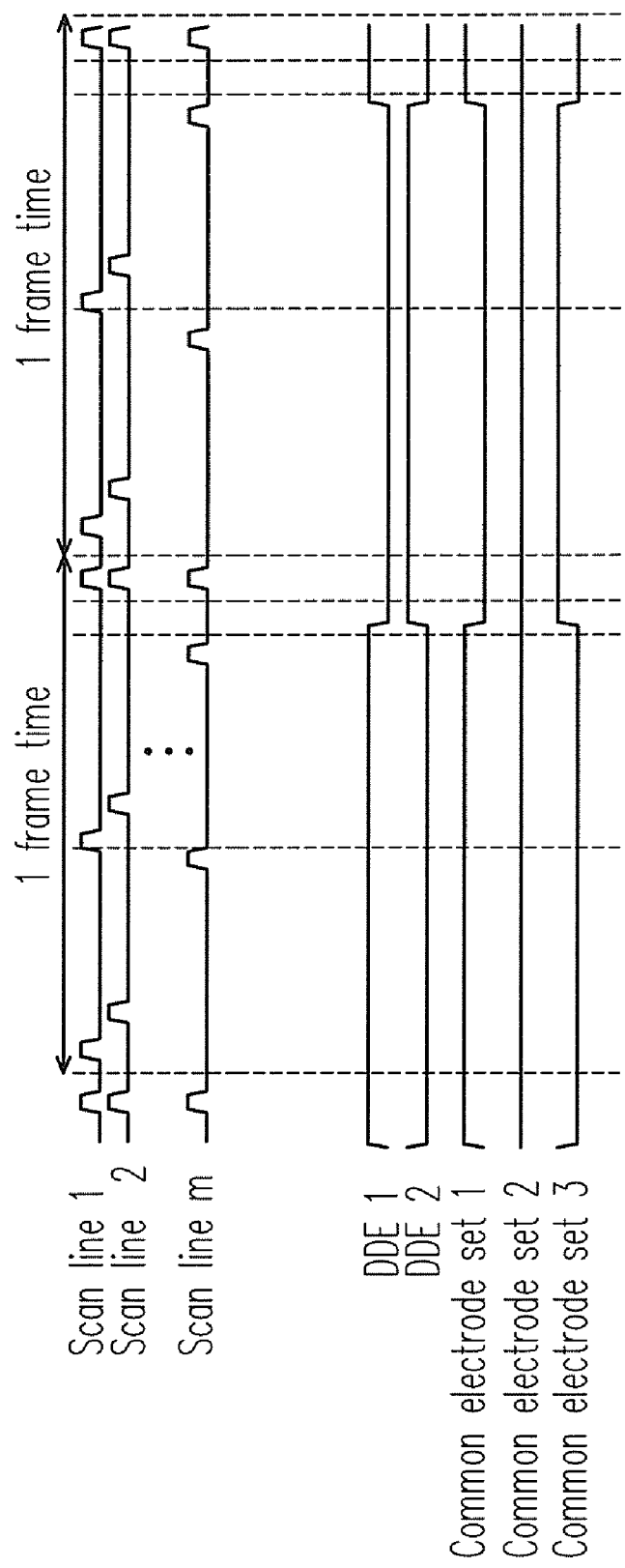
FIG. 6 is a pulse driving waveform timing sequence diagram of an MVA-LCD panel according to the second embodiment of the present invention.

FIG. 6 is a pulse driving waveform timing sequence diagram of an MVA-LCD panel according to the second embodiment of the present invention. Together referring to FIGS. 2B, 5A, 5B and 6, a driving method of pulse driving model according to the embodiment includes the steps as below. First, a control voltage is inputted to a DDE 154 for pre-tilting the liquid crystal molecules 210 of the liquid crystal layer 200. The control voltage can be 16V or −4V. In addition, the control voltage can sustain last a predetermined time. Wherein, the predetermined time can be less than a frame time, for example, less than 16.6×10−3 s or less than 1×10−3 s.

Then, a plurality of common electrode voltages are respectively inputted to the corresponding common electrode sets 412, 414 and 416. The values of the common electrode voltages may be periodically changed and the period may be a frame time, shorter than a frame time, two frame times or more than two frame times. According to an embodiment, the values of the control voltage and the common electrode voltages are periodically changed every frame time. Also, the common electrode voltages and the control voltage can be simultaneously inputted to the corresponding common electrode sets and control electrode (DDE). Further, the predetermined timing difference between inputting the control voltage and the common electrode voltages and inputting the data signals (pixel voltages) can be less than a frame time, for example, less than 16.68×10−3 s or less than 1×10−3 s.

Further, a voltage difference is being sustained between the control voltage and the voltage of the common electrodes while the absolute value of the voltage difference between the control voltage and the common electrodes is larger than the absolute value of the voltage difference between the pixel electrode and the common electrodes. In detail, in order to allow the liquid crystals disposed at the same pixel area to sense different degrees of voltages applied, the foregoing common electrodes are preferred to be at least two common electrode sets being insulated from each other, wherein different voltages can be applied to the common electrode sets. Each of the common electrode sets has different voltage differences with the signal pixel electrode of the lower substrate electrode. The voltage differences are preferred to be ranged from 0.1V to 5V. For example, if there are two common electrode sets whose voltages are respectively 5.6V and 6.4V, and if the voltage value of the pixel electrode is A, the voltage differences between the two common electrode sets and the pixel electrode are respectively |5.6-A|V and |6.4-A|V. Therefore, the difference between the voltages sensed by the liquid crystals corresponding to the foregoing two common electrode sets is 0.8V. Or, if there are three common electrode sets whose voltages are respectively 5.2V, 6V and 6.8V, and if the voltage value of the pixel electrode is A, the voltage differences between the three common electrode sets and the pixel electrode are respectively |5.2-A|V, |6-A|V and |6.8-A|V. Therefore, the difference between the voltages sensed by the liquid crystals corresponding to the foregoing three common electrode sets is 0.8V or 1.6V.

Briefly, when the control voltage is 16V or −4V, the corresponding common electrode voltages can be respectively 5.2V, 6V or 6.8V, therefore the absolute values of the voltage differences between the control electrode and the common electrodes are 9.2V, 10V and 10.8V. Moreover, the pixel electrode voltage is from 0.5V to 6V or from 6V to 11.5V, and the absolute values of the voltage differences between the pixel electrode and the common electrodes are about from 0 to 6.3V. Consequently, there are three voltage differences between a pixel electrode and common electrodes of the upper substrate, wherein the voltage differences that the liquid crystals corresponding to the three sets of common electrodes senses are 0.8V or 1.6V. The illustration is for example only and not to limit the scope of the invention. A range of the voltage differences between 0.1V and 5V is generally related to better results. It is to be noted that when there are only two common electrode sets, the voltages inputted to the two common electrode sets can be, for example, 5.6V and 6.4V.

To simplify the driving method, the common electrode voltages can also be simultaneously inputted in the corresponding common electrode sets 412, 414 and 416. Also, the control voltage can also be inputted to the DDE 154 at the same time. As shown in FIG. 6, a simplified driving method includes: (a) respectively inputting voltages to the two control lines 140 and three common electrode sets 412, 414 and 416, and the voltages that the two control lines 140 and the three common electrode sets 412, 414 and 416 transmitted are different from each other; (b) after a predetermined time which is usually shorter than a normal frame time, respectively inputting data signals to the pixel units 150, being the former half part of the first frame time; (c) thereafter, inputting a dim voltage during the latter part of the first frame time (the data signal voltages are not shown), and then returning back to an black image; (d) changing the value of the control voltage; and repeating the steps from (b) to (d). Such a driving method can fixedly change the voltage of the control electrode every period. The period can be a frame time, less than a frame time or two times of a frame time, or more than two times of a frame time. The driving circuit is comparatively simple, and the complexity of the processing process thereof can be reduced accordingly. Furthermore, the control line 140 and the three common electrode sets 412, 414 and 416 are divided into several parts, being inputted with voltages having different polarities. However, it can also take a pair of control lines 140 as a group and input voltages group by group (as shown in FIG. 3B).

Figure 7A:
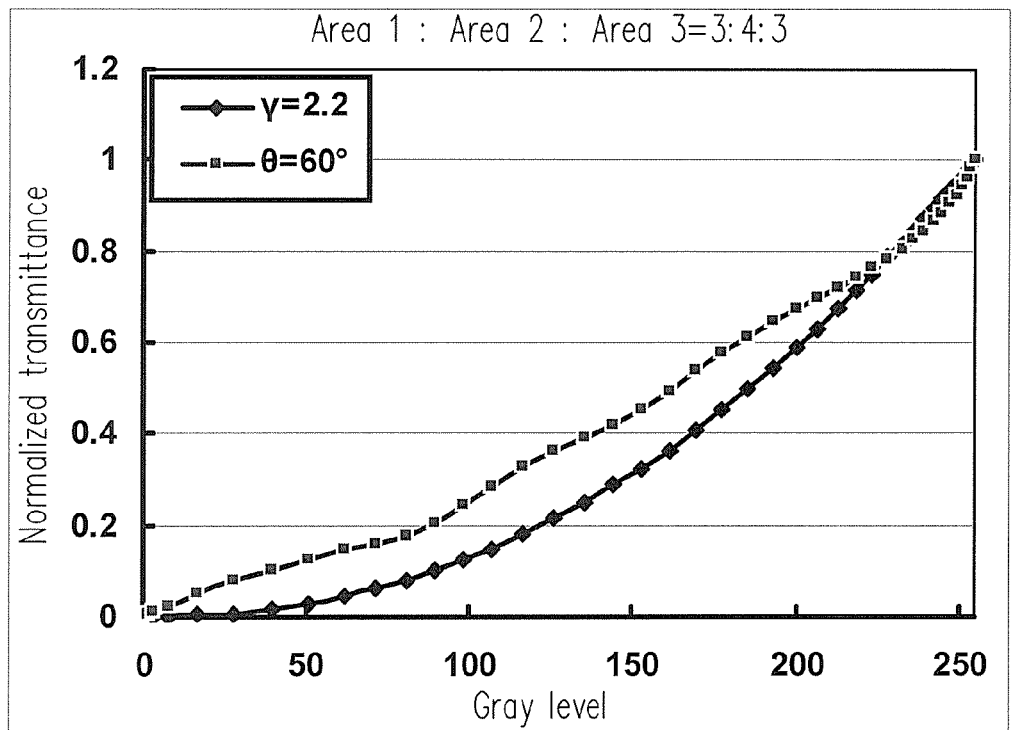
FIG. 7A is a diagram schematically illustrating the relation between the normalized transmittance and the gray level according to the second embodiment of the present invention.
Figure 7B:
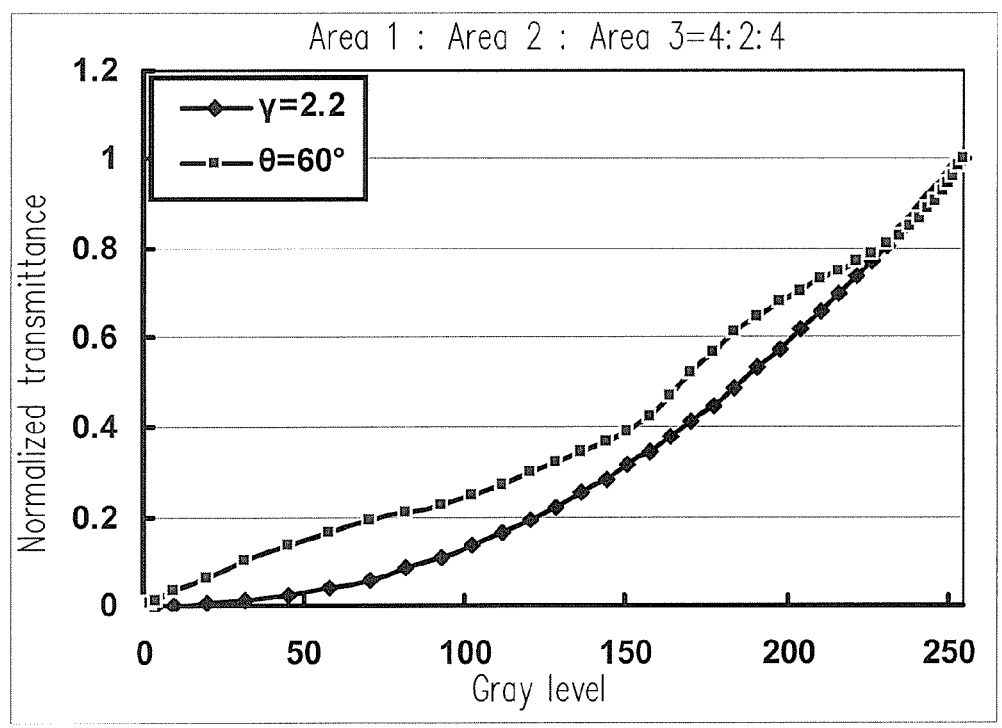
FIG. 7B is another diagram schematically illustrating the relation between the normalized transmittance and the gray level according to the second embodiment of the present invention.

FIG. 7A is a diagram schematically illustrating the relation between the normalized transmittance and the gray level according to the second embodiment of the present invention. FIG. 7B is another diagram schematically illustrating another relation between the normalized transmittance and the gray level according to the second embodiment of the present invention. Referring to FIGS. 7A and 7B, the horizontal coordinate represents the gray level and the vertical coordinate represents the normalized transmittance. In these figures, the area 1, 2, 3 respectively represents the area proportion corresponding to each of the pixel units. Because the common electrode layer 410 includes a plurality of common electrode sets 412, 414 and 416, and the voltages inputted to the common electrode sets are different from each other, there are three kinds of effective voltages applying to the liquid crystal layer 200 over the pixel unit 150.

Figure 1:
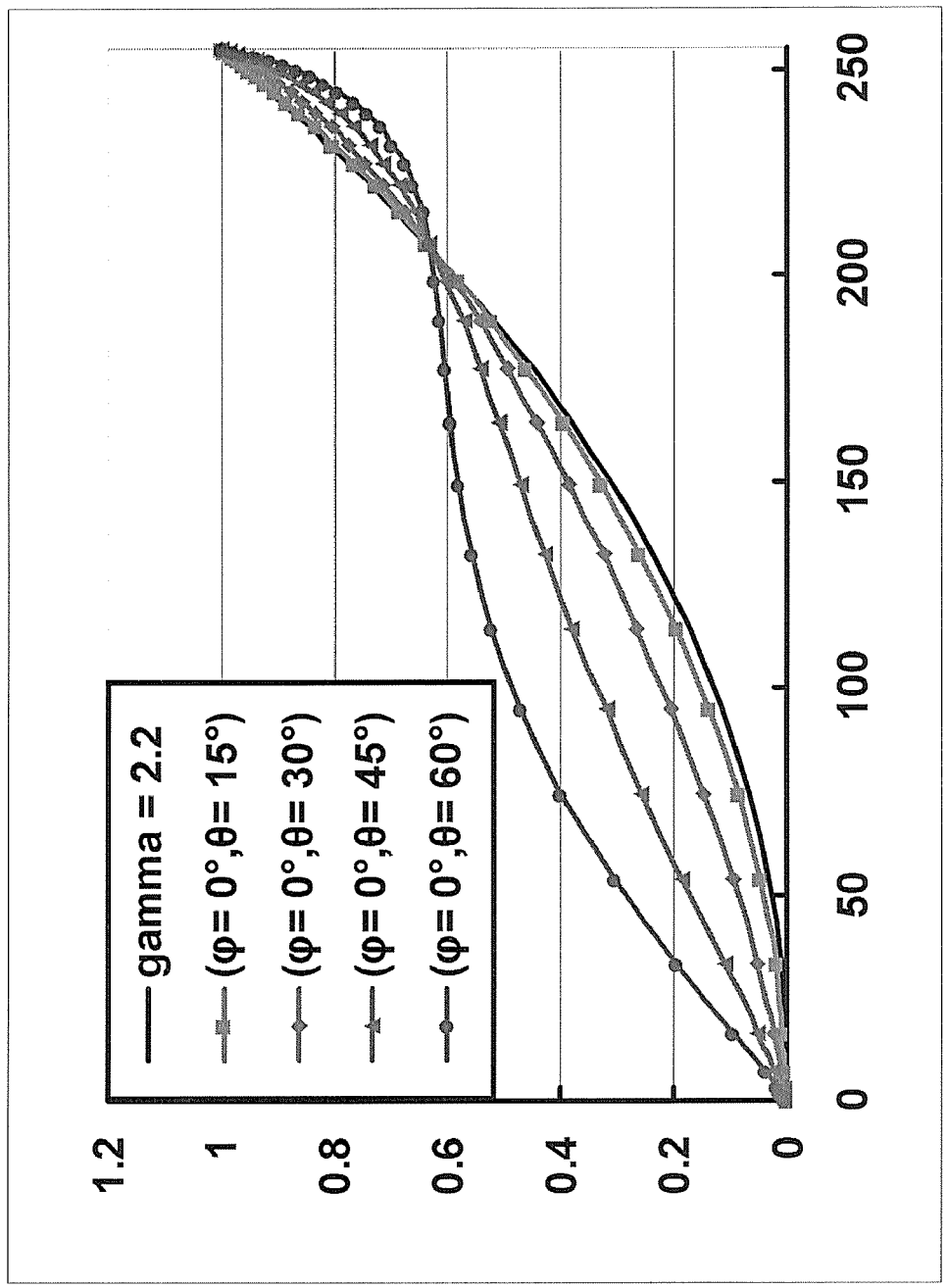
FIG. 1 is a diagram schematically illustrating the relation between the normalized transmittance and the gray level of a conventional MVA-LCD.

In detail, comparing with the conventional technologies (as shown in FIG. 1), it can be known from FIGS. 7A and 7B, the MVA-LCD panel 20 according to the embodiment has better displaying quality. Furthermore, because the area proportions of the common electrode sets are different from each other and the curvature of the transmittance-level curves are not the same, images having better displaying quality can be achieved by properly selecting the area proportions of the common electrode sets. Also, if the common electrode layer 410 is divided into only two or more four common electrode sets, the areas of these two or more than four common electrode sets can be properly arranged in groups for avoiding the problems of color shift and a color washout. It should be noted that, as to be described below in detail, providing more than two effective voltages in a same pixel unit 150 is not limited to the foregoing embodiments.

The Second Embodiment

Figure 8:
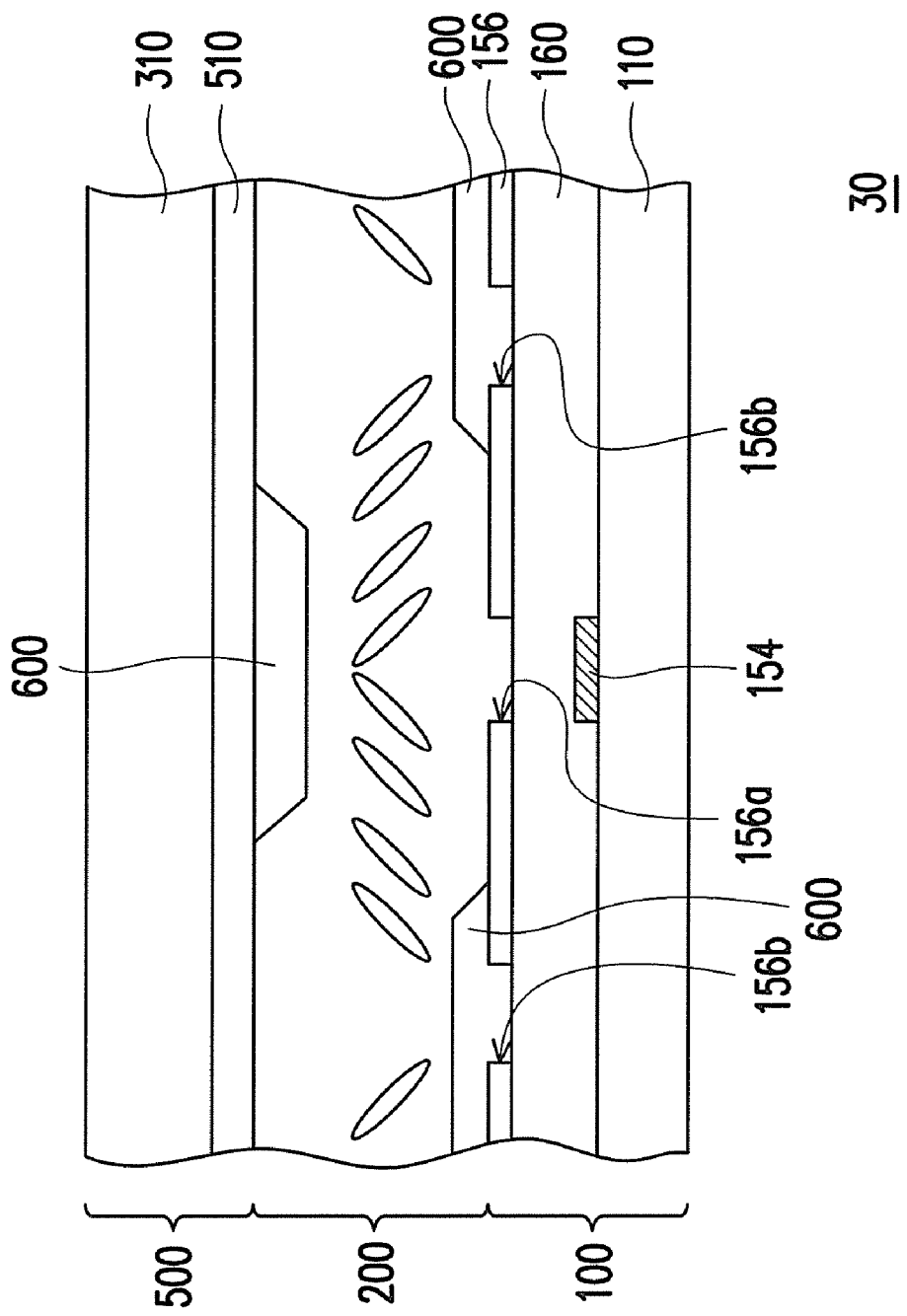
FIG. 8 is a cross-sectional view of an MVA-LCD panel according to the third embodiment of the present invention.

FIG. 8 is a cross-sectional view of an MVA-LCD panel according to the third embodiment of the present invention. Referring to FIG. 8, in an MVA-LCD panel 30 according to the embodiment, an opposite substrate 500 has a common electrode layer 510 facing toward the active component array substrate 100. A dielectric layer 600 covers a part of the common electrode layer 510 and a part of the pixel electrode 156. It should be noted that the dielectric layer 600 may also cover a part of the common electrode layer 510 only or cover a part of the pixel electrode 156 only.

More specifically, the dielectric layer 600 may cover upon the slit 156b (shown at the two sides of FIG. 8) of the pixel electrode 156; and the dielectric layer 600 may also be disposed on the common electrode layer 510 (shown at the central part of FIG. 8) over the DDE 154. Furthermore, the material for forming the dielectric layer 600 can be transparent organic material or transparent inorganic material.

The dielectric layer 600 not only pre-tilts the liquid crystal molecules 210, but also allows the liquid crystal molecules 210 which are disposed over a same pixel unit receiving more than two effective voltages, so as to solve the problem of color shift caused by a change of viewing angles. Moreover, the DDE 154 can solve the problem of light leakage and thus improve the response speed.

In summary, the present invented MVA-LCD panel and the driving method thereof have at least the advantages below:

Because the DDE is composed of nontransparent material, it not only solves the problem of light leakage, but also pre-tilts the liquid crystal molecules for shortening the response time;

To a dot inversion driving model or a pulse driving model, inputting the data signals to the pixel units after a predetermined period of inputting the control voltages to the DDE allows the liquid crystal molecules being pre-tilted. In other words, prior to the input of the data to the pixel units, the liquid crystal molecules have been pre-tilted. Accordingly, the response period is shortened;

Comparing with the conventional technologies, because the common electrode layer is divided into a plurality of common electrode sets which are applied with different voltages, there will be more than two effective voltages applied to the liquid crystal layer over the same pixel unit for solving the problem of color shift and color washout caused by a change of viewing angles; and A dielectric layer is disposed on a part of the common electrode layer and/or a part of the pixel electrode according to the present invention, more than two voltages can be applied to a liquid crystal layer over a same pixel unit.

Other modifications and adaptations of the above-described preferred embodiments of the present invention may be made to meet particular requirements. This disclosure is intended to exemplify the invention without limiting its scope. All modifications that incorporate the invention disclosed in the preferred embodiment are to be construed as coming within the scope of the appended claims or the range of equivalents to which the claims are entitled.

What is claimed is:

1. A multi-domain vertical alignment liquid crystal display (MVA-LCD) panel, comprising:
   an active component array substrate, comprising
      a plurality of scan lines;
      a plurality of data lines;
      a plurality of control lines; and
      a plurality of pixel units, wherein each of the pixel units is controlled by the corresponding scan line, data line and control line, and each of the pixel units comprises:
         an active component electrically connected with the corresponding scan line and the corresponding data line;

a first domain division electrode (DDE) electrically connected with the corresponding control line; and a pixel electrode electrically connected with the active component, the pixel electrode having at least one first slit, and the first DDE being disposed under the at least one first slit;

an opposite substrate having a common electrode layer facing toward the active component array substrate, the common electrode layer having at least one second slit and at least a part of the at least one second slit being disposed over the first DDE, wherein the at least one second slit is substantially aligned to the at least one first slit and the first DDE, the common electrode layer comprising a first common electrode set and a second common electrode set respectively having a first common electrode voltage and a second common electrode voltage different to each other, the first common set comprising a plurality of first common electrodes and the second common set comprising a plurality of second common electrodes, each of the pixel units corresponds to the first common electrode and the second common electrode; and a liquid crystal layer disposed between the active component array substrate and the opposite substrate.

2. The MVA-LCD panel according to claim 1, wherein each of the pixel electrodes of the pixel units further has a plurality of third slits, each of the third slits being located adjacent to the at least one first slit.

3. The MVA-LCD panel according to claim 2, wherein each of the pixel units further comprises a second DDE disposed under a part of the third slits, the second DDE being electrically connected with a corresponding control line.

4. The MVA-LCD panel according to claim 1, wherein the common electrode layer further comprises a third common electrode set comprising a plurality of third common electrodes, the third common electrode set having a voltage different from the voltages of the first common electrode set and the second common electrode set.

5. A method for driving an MVA-LCD panel according to claim 1, the method comprising:
applying a control voltage to a DDE to pre-tilt liquid crystal molecules contained in the liquid crystal layer; and
after a predetermined time of applying the control voltage, applying a data signal to the pixel unit.

6. The method according to claim 5, wherein the value of the control voltage is periodically changed.

7. The method according to claim 5, wherein the absolute value of the voltage difference between the control voltage and the first common voltage or the second common voltage is larger than the absolute value of the voltage difference between the voltage of the pixel electrode and the first common voltage or the second voltage.

8. A method for driving an MVA-LCD panel according to claim 1, the method comprising:
applying a control voltage to a DDE to pre-tilt the liquid crystal molecules contained in the liquid crystal layer;
applying the first common electrode voltage and the second common electrode voltage to the first common electrode set and the second common electrode set respectively; and
after a predetermined time of applying the control voltage, the first common voltage and the second common voltage, applying a data signal to the pixel unit.

9. The method according to claim 8, wherein the value of the control voltage is periodically changed.

10. The method according to claim 8, wherein the first common voltage and the second common voltage are periodically changed, respectively.

11. The method according to claim 8, wherein the control voltage, the first common voltage and the second common voltage are respectively applied to the corresponding DDE, the first common electrode set and the second common electrode set simultaneously.

12. The method according to claim 8, wherein the voltage difference between the first common voltage and the second common voltage is in the range from about 0.1V to about 5V.

* * * * *